United States Patent [19]
Yamamoto et al.

[11] Patent Number: 5,191,641
[45] Date of Patent: Mar. 2, 1993

[54] CURSOR SHIFT SPEED CONTROL SYSTEM

[75] Inventors: Yasushi Yamamoto; Shigeru Fujimura; Futoshi Nakane; Toshikazu Nagaya; Shigeaki Harada; Yasuhiro Takiguchi, all of Nara, Japan

[73] Assignee: Sharp Kabushiki Kaisha, Osaka, Japan

[21] Appl. No.: 814,065

[22] Filed: Dec. 24, 1991

Related U.S. Application Data

[63] Continuation of Ser. No. 409,135, Sep. 19, 1989, abandoned.

[30] Foreign Application Priority Data

Sep. 26, 1988 [JP] Japan ................... 63-241294

[51] Int. Cl.5 .............................. G09G 1/00
[52] U.S. Cl. .................... 395/118; 340/710
[58] Field of Search ........... 340/706, 709, 710, 711; 178/18, 19; 395/155, 156, 159, 100, 118

[56] References Cited

U.S. PATENT DOCUMENTS

| | | | |
|---|---|---|---|
| 4,386,346 | 5/1983 | Levine | 340/709 |
| 4,734,685 | 3/1988 | Watanabe | 340/710 |
| 4,912,672 | 3/1990 | Giorgio | 395/275 |

OTHER PUBLICATIONS

*Getting Started*, Logitech, 1988, pp. 36-37.
Patent Abstract of Japan, JP-A-62-236025 Oct. 16, 1986.
Patent Abstract of Japan, JP-A-61-080421 Apr. 24, 1986.
Patent Abstract of Japan, JP-A-62-128320 Jun. 10, 1987.

*Primary Examiner*—Heather R. Herndon
*Attorney, Agent, or Firm*—Morrison & Foerster

[57] ABSTRACT

A document preparing system includes input processing means for detecting the per-unit-time moving amount of a click such as a mouse and for supplying information to be used for calculation for correction; correction means for executing a calculation for correction based on information supplied from the input processing means and for supplying a corrective value; and mouse cursor moving amount calculation means for calculating the per-unit-time moving amount of a mouse cursor using the corrective value and the per-unit-time mouse moving amount. As the mouse moving speed is higher, the mouse cursor moving speed is further increased. This enables to closely reproduce the mouse user's operation feeling that a fine movement of the mouse is slowly made while a rough movement thereof is quickly made. This improves a smooth operational effectiveness of the mouse.

6 Claims, 3 Drawing Sheets

CURSOR SHIFT SPEED CONTROL SYSTEM

This application is a continuation of application Ser. No. 07/409,135, filed Sep. 19, 1989, now abandoned.

FIELD OF THE INVENTION

The present invention relates to a document preparing system using a click such as a mouse as an input device of a computer, a word-processor or the like.

BACKGROUND OF THE INVENTION

A click such as a mouse is generally used as an input device for office machines typically represented by computers. The combination of such a click with a display device enables the operator to carry out an interactive processing with respect to a machine. More specifically, the operator may operate a mouse cursor on the display device by operating a mouse at hand. The mouse cursor is moved according to the movement of the mouse as if the movement of the mouse is associated directly with the movement of the mouse cursor. This enables the operator to concentrate his attention on the screen of the display device.

FIG. 3 shows a method of moving a mouse cursor with the use of a mouse in a conventional document preparing system; FIG. 3(b) illustrates the movement of the mouse on a mouse input board 13, and FIG. 3(a) illustrates the corresponding movement of the mouse cursor on a display screen 9.

The moving amount of the mouse has no relation to time. For example, the movement of the mouse from a position 14 to a position 15, or from the position 15 to a position 16 is reflected, as it is, on the display device 9. Such movement is displayed as the movement of the mouse cursor from a position 10 to a position 11, or from the position 11 to a position 12. At this time, even though the mouse is moved from the position 15 to the position 16 at a speed higher than that at which the mouse is moved from the position 14 to the position 15, the movement of the mouse cursor from the position 11 to the position 12 is not carried out at a speed higher than that of the mouse cursor movement from the position 10 to the position 11. That is, regardless of the mouse moving amount, the mouse cursor is moved by an amount in which the mouse movement amount is multiplied by a constant. It is therefore difficult to efficiently achieve both fine and broad movements of the mouse.

More specifically, the mouse cursor moving method in a conventional document preparing system is of the linear type in which the movement of the mouse cursor on the display device corresponding to the mouse operation by the operator, is in function of only the amount of mouse movement on the mouse input board. Accordingly, it is difficult to closely reproduce the user's operation feeling that a fine operation is slowly made, while a rough operation is quickly made. This is particularly disadvantageous in a bit map display having a high resolution.

SUMMARY OF THE INVENTION

It is an object of the present invention to provide a document preparing system in which the mouse cursor may be precisely designated or positioned in a fine area on a display device by operating the mouse slowly and finely, while the mouse may be quickly moved to a remote position so that the per-unit-time moving amount of the mouse cursor may be increased.

It is another object of the present invention to provide a document preparing system capable of closely reproducing the operation feeling that a fine movement of the mouse is slowly made while a rough movement of the mouse is quickly made, thereby to improve a smooth operational effectiveness.

To achieve the objects above-mentioned, the document preparing system in accordance with the present invention comprises:

input processing means for detecting the per-unit-time moving amount of a click such as mouse and for supplying information to be used for calculation for correction;

correction means for executing a calculation for correction based on information supplied from the input processing means and for supplying a corrective value; and mouse cursor moving amount calculation means for calculating the per-unit-time moving amount of a mouse cursor based on the corrective value and the per-unit-time mouse moving amount.

According to the arrangement above-mentioned, when the per-unit-time mouse moving amount is small, the per-unit-time mouse cursor moving amount is linearly proportional to the per-unit-time mouse moving amount. When the per-unit-time mouse moving amount is great, the per-unit-time mouse cursor moving amount is so corrected as to be further increased.

BRIEF DESCRIPTION OF THE DRAWINGS

FIG. 1 is a block diagram of the arrangement of the present invention;

FIG. 2 is a graph showing the per-unit-time moving amount of a mouse cursor corresponding to the per-unit-time moving amount of a mouse, according to each of the present invention and a conventional system; FIG. 3(a) showing a display device, and FIG. 3(b) showing a mouse input device.

DESCRIPTION OF THE EMBODIMENTS

Figure 1:
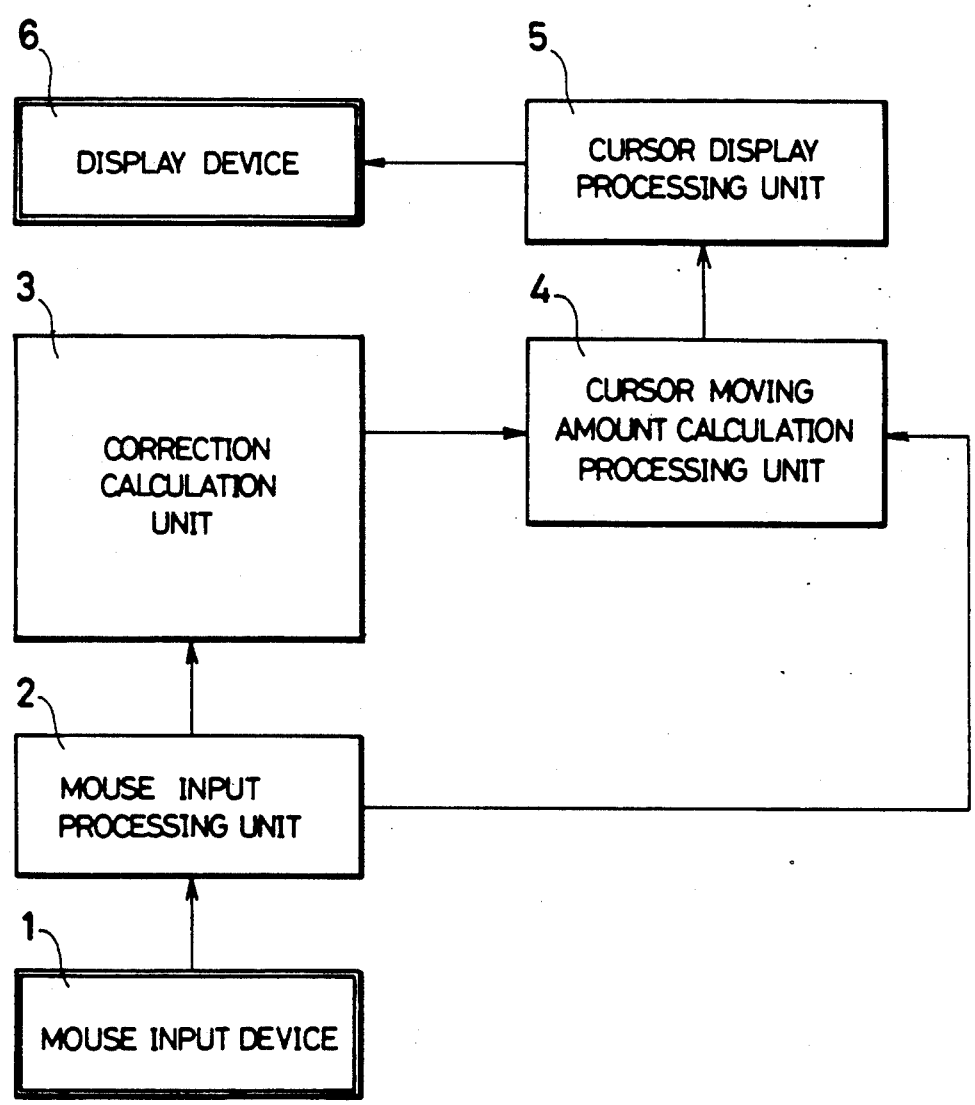
FIGS. 1 and 2 show an embodiment of the present invention.
Figure 2:
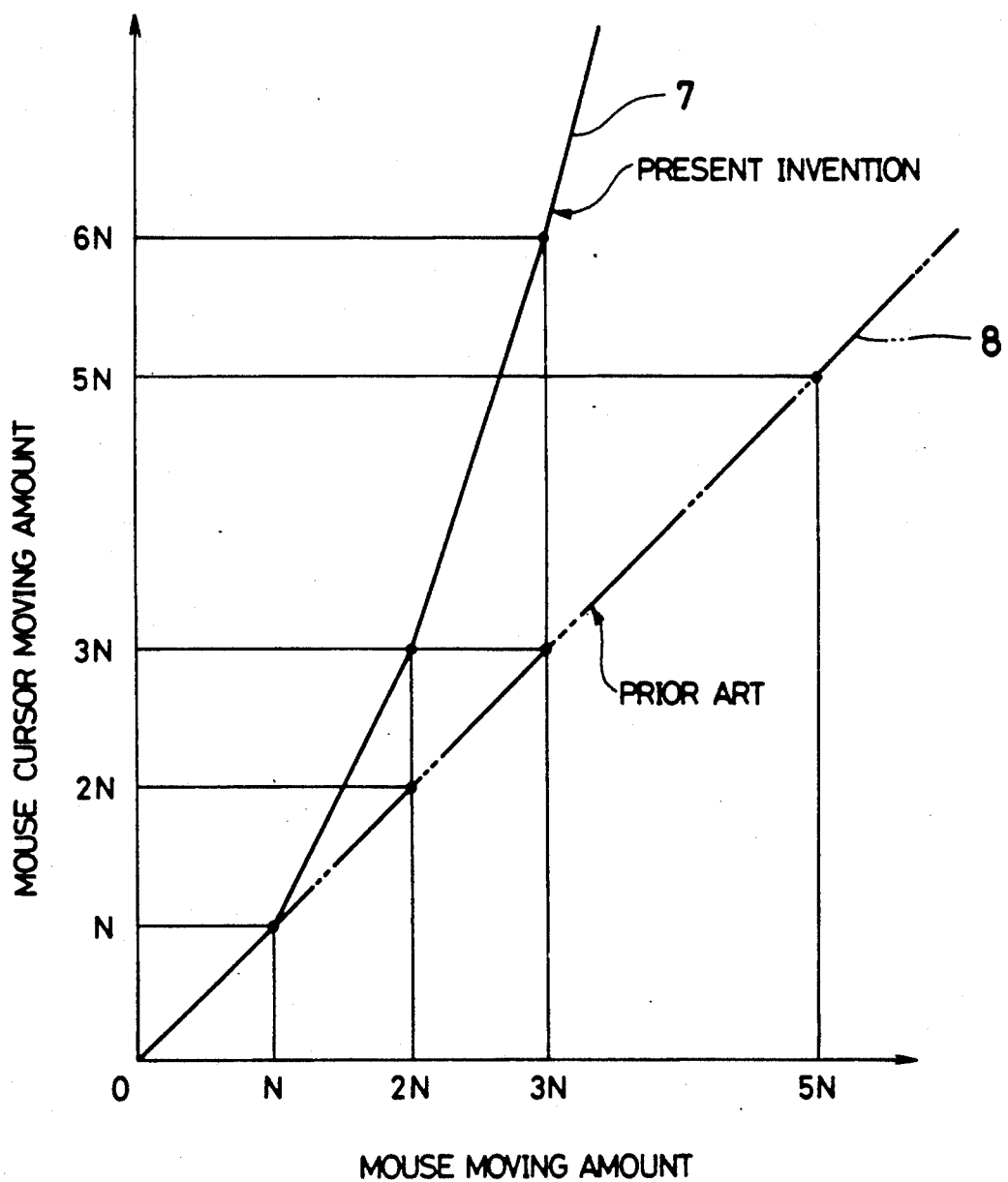
Figure 3A:
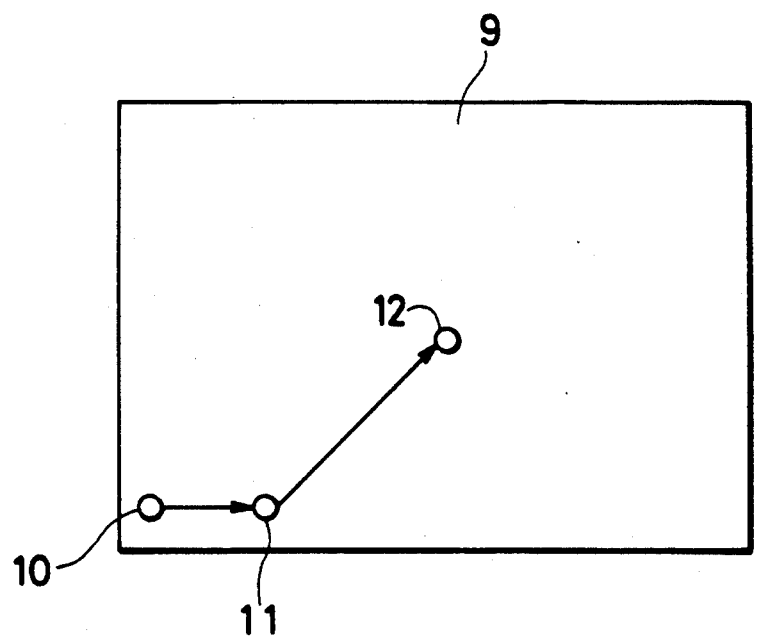
FIGS. 3(a)-(b) shows how a mouse cursor movement corresponds to a mouse movement according to a conventional system.
Figure 3B:
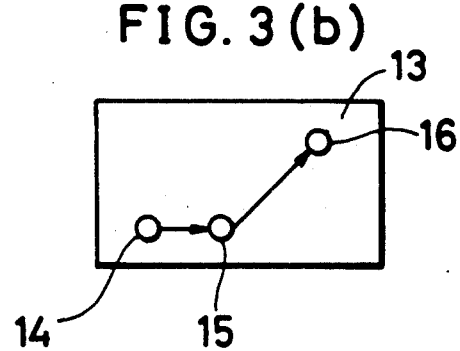

The following description will discuss an embodiment of the present invention with reference to FIGS. 1 and 2.

As shown in FIG. 1, processing is made such that a per-unit-time mouse moving amount m entered from a mouse input device is sent to a mouse input processing unit 2, as input processing means, in which a calculation of $(ml = m - N)$ is carried out and the result value ml (information to be used for calculation for correction) is sent to a correction calculation unit 3 as correction calculation means. Here, N is a threshold constant of the per-unit-time mouse moving amount m. Processing is also made such that the per-unit-time mouse moving amount m is sent to a cursor moving amount calculation processing unit 4 which constitutes mouse cursor moving amount calculation means. The per-unit-time mouse moving amount m is the total sum of pulses having a predetermined frequency which are generated from a pulse generator (not shown) during a predetermined period of time. Accordingly, it may be judged that the mouse moving speed is higher as the moving amount m is greater. When ml is positive, the correction calculation unit 3 further executes a correction processing to be discussed later, and the corrective value thus obtained is sent to the cursor moving amount calculation processing unit 4. When m1 is equal to 0 or negative, the corrective value sent from the correction calculation unit 3 to the cursor moving calculation processing unit 4, is equal to 0. In the cursor moving amount calculation processing unit 4, the corrective value obtained from the correction calculation unit 3 is added to the per-unit-time moving amount m obtained from the mouse input processing unit 2. The resultant value thus added is sent, as a per-unit-time mouse cursor moving amount, to a cursor display processing unit 5. In the cursor display processing unit 5, the per-unit-time mouse cursor moving amount sent from the cursor moving amount calculation processing unit 4 is added to a value representing the position of the mouse cursor located immediately before the mouse is operated. Thus, there is obtained a mouse cursor position on a display device 6. The mouse cursor is then actually moved to the position thus obtained. When m1 is positive, the correction processing in the correction calculation unit 3 is made as outlined below.

When $m2$ is equal to $(m1-N)$, and $m3$ is equal to $(m2-N)$ and so on, $(m1+m2+m3+...)$ is used as a corrective value (where $m1$, $m2$, $m3$ ... are positive). Accordingly, as the per-unit-time mouse moving amount m is greater, the corrective value is greater. As the result, the per-unit-time mouse cursor moving amount is further increased.

For example, when the per-unit-time mouse moving amount m is equal to a value in a range from 1 to N, $(m-N)$ is equal to or smaller than 0. Accordingly, the mouse moving amount m represents, as it is, the mouse cursor moving amount. When m is a value in a range from $(N+1)$ to $2N$, $m1$ is equal to $(m-N)$ which is equal to $(N+1-N)$ which is equal to 1, where m is equal to $(N+1)$. Therefore, $m2$ is equal to $(1+N)$ which is smaller than zero. On the other hand, where m is equal to $2N$, $m1$ is equal to $(m-N)$ which is equal to $(2N-N)$ which is equal to N. Therefore, $m2$ is equal to $(N-N)$ which is equal to zero. Accordingly, the corrective value is equal to $m1$. As the result, the mouse cursor moving amount is equal to $(m+m1)$. Likewise, the corrective value is equal to $(m+m1+m2)$ when m is in a range from $(2N+1)$ to $3N$. Thus, the mouse cursor moving amount may be successively corrected such that, as the per-unit-time mouse moving amount m is greater, the corrective value becomes greater and the per-unit-time mouse cursor moving amount on the actual screen of the display device is also greater.

FIG. 2 shows the relationship between the mouse moving amount (on the axis of abscissa) and the mouse cursor moving amount (on the axis of ordinate). In FIG. 2, the mouse cursor movement in the document preparing system in accordance with the present invention is shown by a solid line 7, while a conventional movement is shown by a two-dot chain line 8 as a comparative example.

For example, when the per-unit-time mouse moving amount m is equal to the threshold constant N, the per-unit-time mouse cursor moving amounts in the present invention and the conventional method are equal to N. That is, the mouse cursor on the display device according to the present invention is moved at the same speed as that in the conventional method. When the per-unit-time mouse moving amount m is equal to 3N, the mouse cursor moving amount is equal to 3N in the conventional method, while it is equal to 6N in the present invention. That is, the mouse cursor on the display device in the present invention is moved at double the conventional mouse cursor moving speed.

It is understood from the foregoing that, according to the mouse cursor moving method in the document preparing system of the present invention, as the mouse moving amount is greater, the mouse cursor moving amount is further increased as compared with the conventional method.

As thus described, the document preparing system according to the present invention comprises: input processing means for detecting the per-unit-time moving amount of a click such as mouse and for supplying information to be used for calculation for correction; correction means for executing a calculation for correction based on information supplied from the input processing means and for supplying a corrective value; and mouse cursor moving amount calculation means for calculating the per-unit-time moving amount of a mouse cursor based on the corrective value and the per-unit-time mouse moving amount.

With such arrangement, the mouse cursor may be precisely designated and positioned in a fine area on the display device by operating the mouse slowly and finely, while the mouse may be quickly moved to a remote position so that the per-unit-time mouse cursor moving amount is increased, enabling the mouse cursor to be quickly moved to the desired position. This enables the mouse to be smoothly operated. Further, a changeover of the mouse cursor moving amount may be achieved quite naturally and smoothly with no particular operation required. This gives the operator a good mouse operation feeling.

The invention being thus described, it will be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A cursor shift speed control system, comprising:
a mouse input means for actuating a cursor on a display so that the cursor moves in response to movement of the mouse input means;
input means for detecting a moving speed of the mouse input means;
correction means connected to the mouse input means, for comparing the moving speed of the mouse input means with a predetermined threshold value set int he correction means, and for calculating corrective values, wherein the greater the moving speed of the mouse input means compared to the predetermined threshold value, the greater the corrective values;
cursor speed calculation means connected to the input means and the correction means, for calculating a corrected cursor speed on the display screen by adding the corrective values one by one to the moving speed of the mouse input means, wherein the corrective values are added one by one as the moving speed of the mouse input mans becomes progressively greater than the predetermined threshold value, whereby the corrected cursor speed is increased from a linear relationship between the moving speed of the mouse input means and the corrected cursor speed to a nonlinear relationship between the moving speed of the mouse input means nd the corrected cursor speed, a rate of change of the corrected cursor speed increasing progressively in accordance with the corrective values added to the moving speed of the mouse input means;

cursor display processing means connected to the cursor speed calculation means, for displaying the cursor on the display screen by successively calculating a displaying position of the cursor based on the corrected cursor speed.

2. The cursor shift speed control system as claimed in claim 1, wherein the predetermined threshold value is set by a pulse generator for supplying pulses having a predetermined frequency and a counter for counting the number of pulses, and wherein the mouse input means has a per-unit-time moving amount which is adapted to be detected based on an output form the counter.

3. A cursor speed control system, as claimed in claim 1, wherein the mouse input means includes a subtraction circuit capable of subtracting the predetermined threshold value form any per-unit-time mouse moving amount entered therein.

4. A cursor shift speed control system, as claimed in claim 1, wherein the correction means includes a circuit for supplying a corrective value equal to zero when the entered information is equal to zero or a negative number.

5. A cursor shift speed control system, as claimed in claim 5, wherein the correction means includes a circuit for executing a predetermined correction processing on an entered information value, when the entered information value is positive.

6. A cursor shift speed control system, as claimed in claim 1, wherein the cursor speed calculation means includes an addition circuit for adding the corrective value to the per-unit-time mouse input means moving amount entered therein.

* * * * *